(12) United States Patent
Lin

(10) Patent No.: US 11,258,647 B1
(45) Date of Patent: Feb. 22, 2022

(54) RECEIVER AND ASSOCIATED SIGNAL PROCESSING METHOD

(71) Applicant: Realtek Semiconductor Corp., HsinChu (TW)

(72) Inventor: Chia-Hung Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/343,764

(22) Filed: Jun. 10, 2021

(30) Foreign Application Priority Data

Jan. 15, 2021 (TW) ................................. 110101523

(51) Int. Cl.
*H04L 27/26* (2006.01)
*H04L 25/02* (2006.01)

(52) U.S. Cl.
CPC ........ *H04L 27/265* (2013.01); *H04L 25/0212* (2013.01); *H04L 27/26526* (2021.01)

(58) Field of Classification Search
CPC ............... H04L 27/2613; H04L 27/265; H04L 27/26526; H04L 27/2655; H04L 5/0007; H04L 5/0044; H04L 27/2634; H04L 27/2647; H04L 27/2656; H04L 27/2659; H04L 5/0048
See application file for complete search history.

(56) References Cited

U.S. PATENT DOCUMENTS

| | | | | |
|---|---|---|---|---|
| 2008/0198942 A1* | 8/2008 | Akella | ................ | H04L 27/2647 375/260 |
| 2009/0185630 A1* | 7/2009 | Yang | ................... | H04L 25/0228 375/260 |
| 2014/0286468 A1* | 9/2014 | Lee | ..................... | H04L 27/2663 375/371 |

OTHER PUBLICATIONS

ATSC Standard A322-2018-Physical-Layer-Protocol, Dec. 26, 2018.

* cited by examiner

*Primary Examiner* — Khanh C Tran
(74) *Attorney, Agent, or Firm* — Winston Hsu

(57) ABSTRACT

A signal processing method including the steps of: using a FFT window to process a last symbol of a first sub-frame of a frame to generate a frequency-domain signal, wherein the FFT window has a first start point; performing an IFFT operation on the frequency-domain signal to generate a channel impulse response; performing a channel estimation on the channel impulse response to generate a channel profile; referring to the channel profile of the last symbol of the first sub-frame, an attribute of a start symbol of a second sub-frame and the first FFT window start point to determine a second FFT window start point; using the FFT window having the second start point to process the start symbol of the second sub-frame to generate another frequency-domain signal.

16 Claims, 7 Drawing Sheets

US 11,258,647 B1

RECEIVER AND ASSOCIATED SIGNAL PROCESSING METHOD

BACKGROUND OF THE INVENTION

1. Field of the Invention

The present invention relates to a receiver arranged in a display device, and more particularly, to a receiver that is capable of performing a channel estimation operation.

2. Description of the Prior Art

In the specification of Advanced Television Systems Committee (ATSC) version 3.0, a frame structure applied in Orthogonal Frequency-Division Multiplexing (OFDM) system is disclosed. Wherein, each frame includes multiple sub-frames, and each sub-frame may have different parameters. For example, each frame may have different Fast Fourier Transform (FFT) lengths, different guard interval lengths, or different scattered pilot patterns. Therefore, when switching to the next sub-frame with different parameters, a channel estimation operation may be suffered from inter-symbol interference (ISI) due to a poor position of the FFT window being selected, or the subsequent decoding performance may be degraded or the decoding cannot be performed correctly due to a poor position of a channel impulse response (CIR) being arranged.

SUMMARY OF THE INVENTION

One of the objectives of the present invention is to provide a receiver arranged in a display device and being capable of performing a channel estimation operation on a current sub-frame according to parameters used in a previous sub-frame, to solve the aforementioned problems.

An embodiment of the present invention discloses a signal processing method, comprising: using a Fast Fourier Transform (FFT) window to process a last symbol of a first sub-frame of a frame to generate a first frequency-domain signal, wherein the FFT window has a first FFT window start point; performing an Inverse Fast Fourier Transform (IFFT) operation on the first frequency-domain signal to generate a first channel impulse response; performing a channel estimation on the first channel impulse response to generate a first channel profile of the last symbol of the first sub-frame; referring to the first channel profile of the last symbol of the first sub-frame, an attribute of a start symbol of a second sub-frame of the frame and the first FFT window start point to determine a second FFT window start point; and using the FFT window having the second FFT window start point to process the start symbol of the second sub-frame of the frame to generate a second frequency-domain signal.

An embodiment of the present invention further discloses a receiver comprising a Fast Fourier Transform (FFT) circuit, an Inverse Fast Fourier Transform (IFFT) circuit, a channel estimation circuit and a FFT window start point calculation circuit. The FFT circuit is configured to use a Fast Fourier Transform (FFT) window to process a last symbol of a first sub-frame of a frame to generate a first frequency-domain signal. The FFT window has a first FFT window start point. The IFFT circuit is configured to perform an IFFT operation on the first frequency-domain signal to generate a first channel impulse response. The channel estimation circuit is configured to perform a channel estimation on the first channel impulse response to generate a first channel profile of the last symbol of the first sub-frame. The FFT window start point calculation circuit is configured to refer to the first channel profile of the last symbol of the first sub-frame, an attribute of a start symbol of a second sub-frame of the frame and the first FFT window start point to determine a second FFT window start point. The FFT circuit uses the FFT window having the second FFT window start point to process the start symbol of the second sub-frame of the frame to generate a second frequency-domain signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
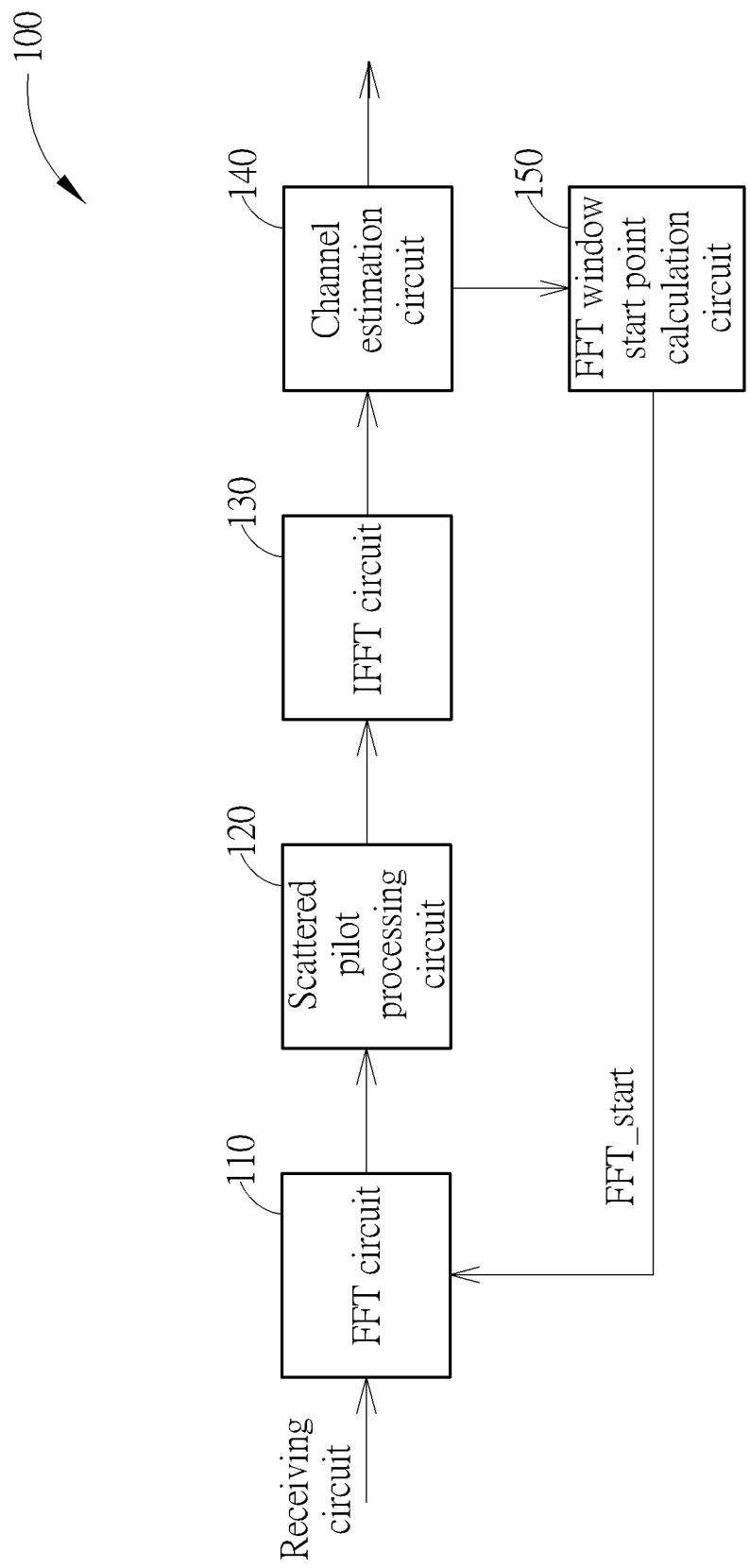
FIG. 1 is a diagram illustrating a receiver according to an embodiment of the present invention.

FIG. 1 is a diagram illustrating a receiver 100 according to an embodiment of the present invention. As shown in FIG. 1, the receiver 100 includes a Fast Fourier Transform (FFT) circuit 110, a scattered pilot processing circuit 120, an Inverse Fast Fourier Transform (IFFT) circuit 130, a channel estimation circuit 140, and an FFT window start point calculation circuit 150. In the present embodiment, the receiver 100 is arranged in a display device. For example, the receiver 100 is arranged in a television (TV), and the operation of the receiver 100 supports a standard of ATSC version 3.0, but the present invention is not limited thereto.

Figure 2:
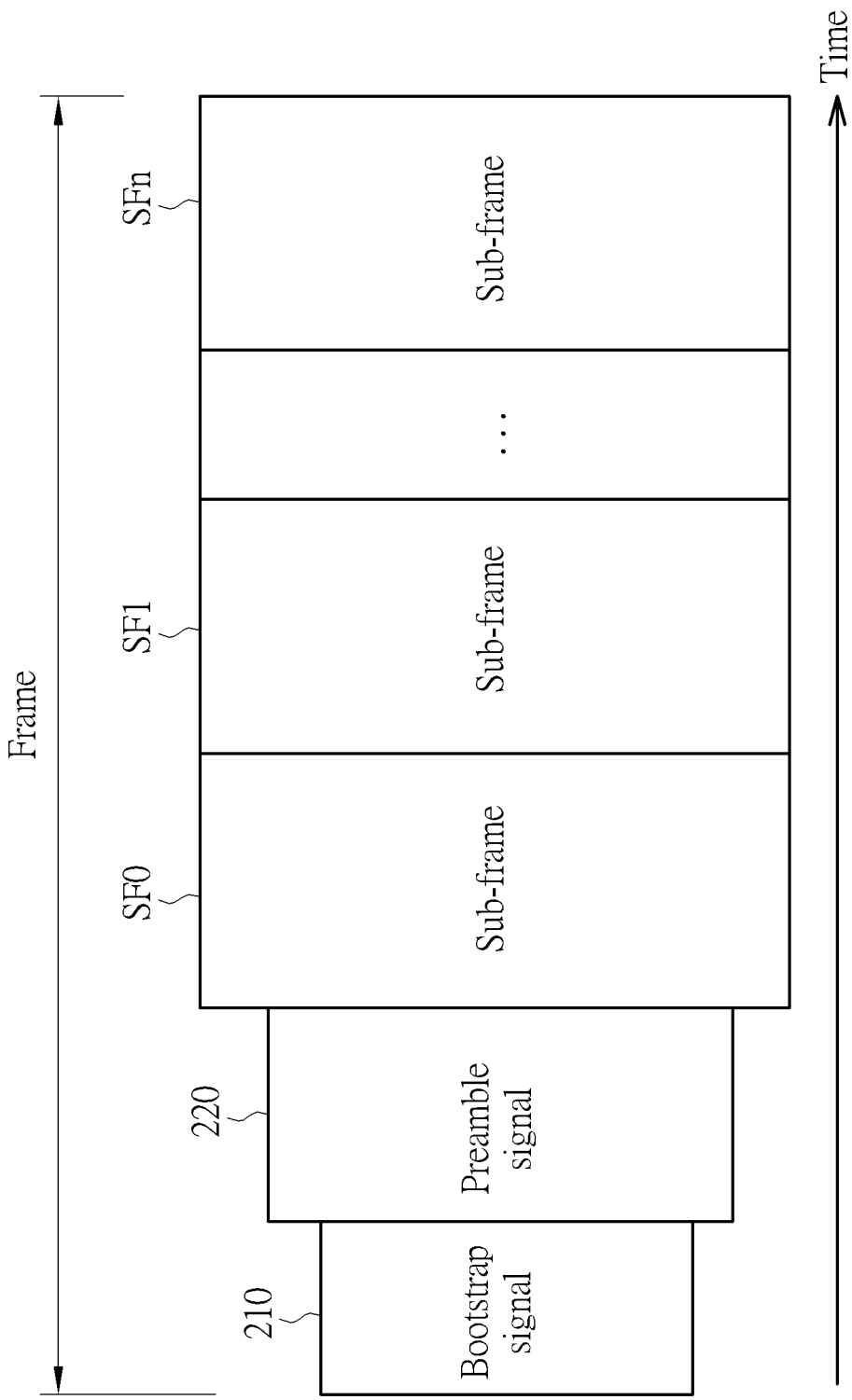
FIG. 2 is a diagram illustrating a structure for receiving signal conforming to a specification of ATSC version 3.0.
Figure 3:
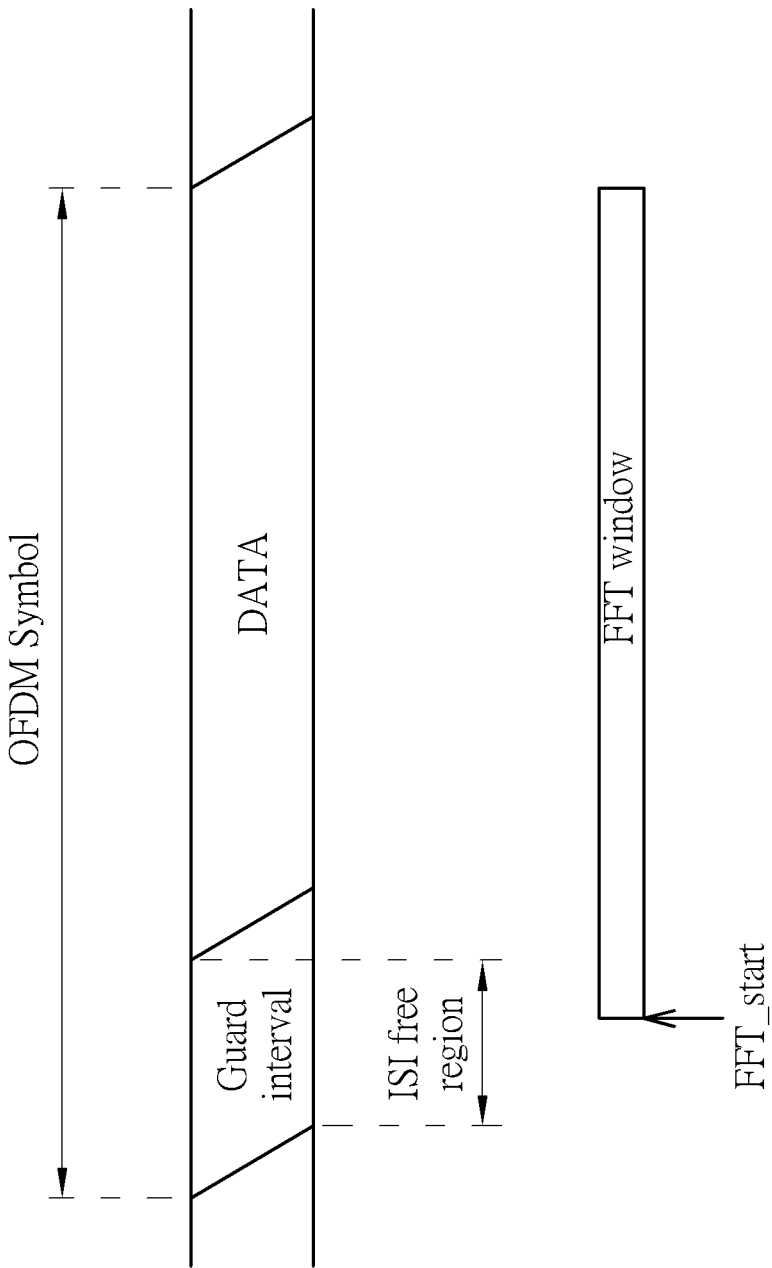
FIG. 3 is a diagram illustrating an OFDM symbol and a FFT window.
Figure 4:
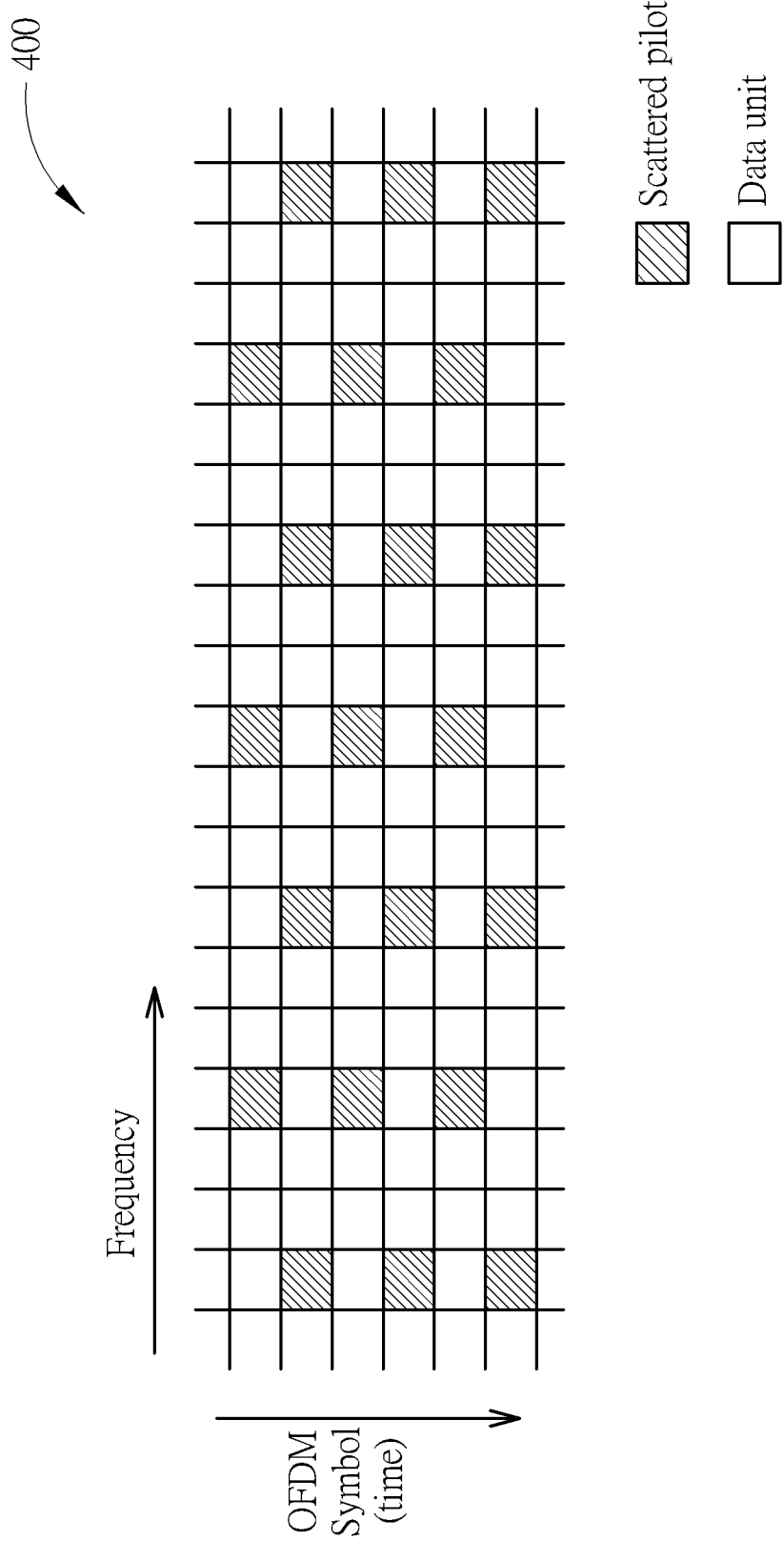
FIG. 4 is a diagram illustrating a frequency-domain signal.

In the operation of the receiver 100, it is assumed that a received signal received by the receiver 100 conforms to the specification of ATSC version 3.0, and the received signal has a structure shown in FIG. 2. As shown in FIG. 2, a frame of the received signal includes a bootstrap signal 210, a preamble signal 220 and a plurality of sub-frames (FIG. 2 shows the sub-frames SF0-SFn), wherein the bootstrap signal 210 is configured to be identified by the receiver 100, and the preamble signal 220 includes relevant attributes of the plurality of sub-frames SF0-SFn. For example, the attributes include an FFT length, a guard interval length, a scattered pilot pattern, etc. of OFDM symbols in each of sub-frames SF0-SFn. When the receiver 100 receives the frame shown in FIG. 2, the FFT circuit 110 performs FFT on the received signal to generate a frequency-domain signal. Specifically, please refer to FIG. 3. An OFDM symbol includes a guard interval and a data, wherein the content of the guard interval is copied from a latter part of content of the data, and the guard interval includes an inter-symbol interference (ISI) free region, that is, when the FFT circuit 110 performs FFT, the FFT window start point FFT_start used by FFT needs to be located in the ISI free region to prevent subsequent inter-symbol interference. Ideally, the FFT window start point FFT_start should be located in the center of the ISI free region as much as possible. FIG. 4 illustrates a diagram of a frequency-domain signal 400 output by the FFT circuit 100, where the frequency-domain signal 400 corresponds to a partial content of a sub-frame. The frequency-domain signal 400 includes multiple scattered pilots and multiple data units, where the distribution method and quantity of the scattered pilots constitute a scattered pilot pattern. The frequency-domain signal 400 that is taken as an example for illustration is based on the SP3.2 mode in the specification of ATSC version 3.0. In the present embodiment, the scattered pilot processing circuit 120 performs an interpolation operation on the scattered pilots in the frequency-domain signal 400, such that the frequency-domain signal 400 will have one scattered pilot in every three data units after being processed. Since the scattered pilot pattern and the processing method of the scattered pilot processing circuit 120 are known to those skilled in the art, further description is omitted here for simplicity.

Figure 5:
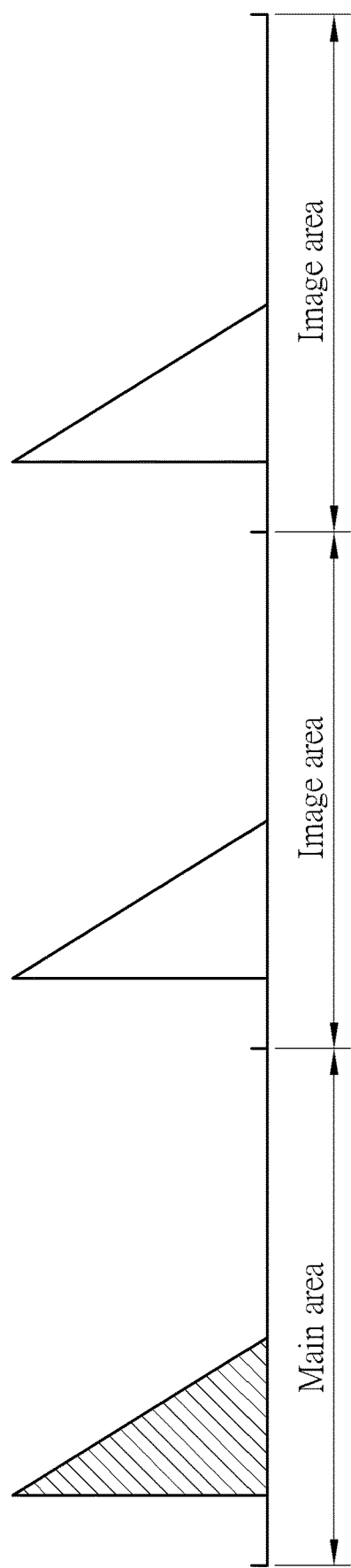
FIG. 5 is a diagram illustrating a channel impulse response.

Then, the IFFT circuit 130 performs an Inverse Fast Fourier Transform (IFFT) operation on the processed frequency-domain signal output by the scattered pilot processing circuit 120 to generate a channel impulse response as shown in FIG. 5. The channel impulse response includes a main area and multiple image areas, and the number of image areas is determined according to the scattered pilot pattern. For a case where there is one scattered pilot in every N data units, the channel impulse response will have (N−1) image areas. There will be a scattered pilot pattern in every three data units as an illustration in FIG. 5. As shown in FIG. 5, the width of the main area and each image area is the length of the FFT window divided by the above-mentioned 'N'. For example, assuming that the length of the FFT window is '8192', there will be a scatter pilot in every three units (i.e., N=3), such that the width of the main area and each image area is '8192/3'.

Figure 6:
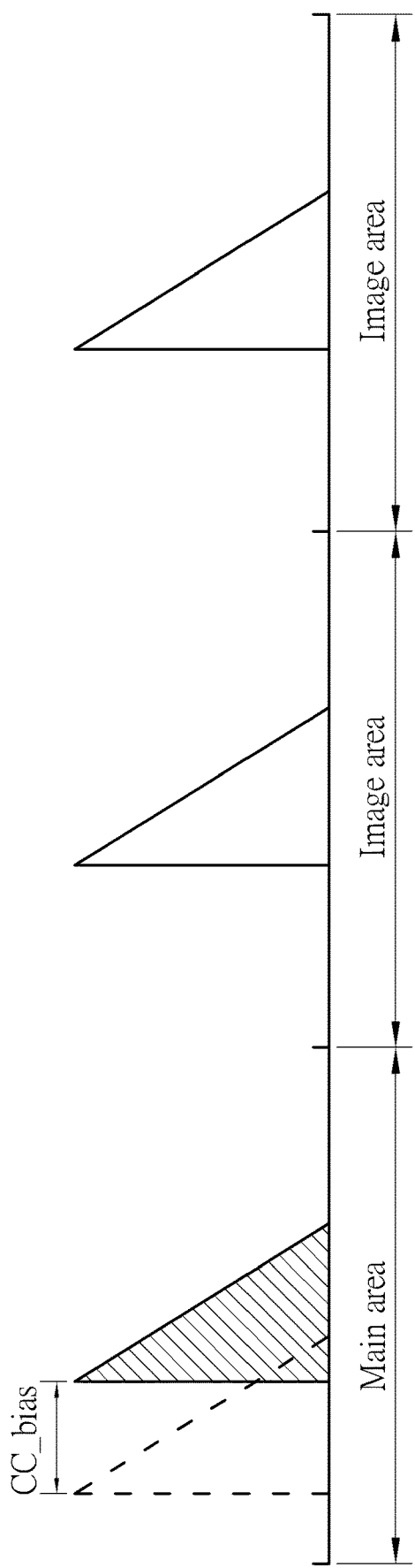
FIG. 6 is a diagram illustrating the channel impulse response being moved by an offset.

Then, referring to FIG. 6 regarding the operation of the channel estimation circuit 140, the channel estimation circuit 140 moves the channel impulse response by a channel offset CC_bias to generate an adjusted channel impulse response, wherein the channel offset CC_bias is configured to move the channel impulse response to the center of the main area, to facilitate subsequent operations on a channel profile. After generating the adjusted channel impulse response as shown in FIG. 6, the channel estimation circuit 140 performs a filtering operation on the adjusted channel impulse response, to filter out the image areas and further filter out the noise in the main area to generate a processed channel impulse response; after that, the channel estimation circuit 140 performs the FFT operation and an equalization operation on the processed channel impulse response to obtain the channel profile of each OFDM symbol for the operation of a back-end circuit.

In the above operations regarding the FFT circuit 110, the scattered pilot processing circuit 120, the IFFT circuit 130 and the channel estimation circuit 140, the FFT window start point FFT_start and the channel offset CC_bias are two important parameters that will affect subsequent signal processing. These two parameters can be adjusted to appropriate values after the channel estimation circuit 140 determines the channel profile, such that the FFT window start point FFT_start is located in the center of the ISI free region, and the adjusted channel impulse response can also be located in the center of the main area. After the FFT window start point FFT_start and the channel offset CC_bias are adjusted to the optimal values, subsequent OFDM symbols of the sub-frame may be processed using the same FFT window start point FFT_start and the same channel offset CC_bias due to the fact that OFDM symbols of the same sub-frame have the same attributes, such as the same FFT length, guard interval length and scattered pilot pattern.

However, when there is switching between sub-frames (for example, the sub-frame SF0 is switched to the sub-frame SF1), the receiver 100 may process the start OFDM symbol of the sub-frame SF1 by using an unsuitable FFT window start point FFT_start and an unsuitable channel offset CC_bias due to that fact that attributes of the sub-frame SF1 are not all the same as the attributes of the sub-frame SF0, which may cause difficulties in subsequent processing. Therefore, the FFT window start point calculation circuit 150 is proposed in the present embodiment, to calculate the FFT window start point FFT_start and the channel offset CC_bias used to process the start OFDM symbol of the sub-frame SF1 according to the channel profile calculated based on the last OFDM symbol of sub-frame SF0 and the attributes of sub-frame SF1. After that, according to the channel profile corresponding to the start OFDM symbol of the sub-frame SF1, the FFT window start point FFT_start and the channel offset CC_bias are adjusted to the optimal values.

Specifically, the channel profiles of two adjacent OFDM symbols generally do not have much difference. Therefore, the FFT window start point calculation circuit 150 directly regards the channel profile calculated by the last OFDM symbol of the sub-frame SF0 as the channel profile of the start OFDM symbol of the sub-frame SF1, and calculates the FFT window start point FFT_start and the channel offset CC_bias of the start OFDM symbol in the sub-frame SF1 processed by the receiver 100 according to the attribute difference between the sub-frame SF1 and the sub-frame SF0. For example, the FFT window start point FFT_start_1 of the start OFDM symbol of the sub-frame SF1 can be calculated using the following formula: FFT_start_1=FFT_start_0+FFT_size_0+GI_len_1+ FFT_win_adj; wherein, 'FFT_start_0' is the FFT window start point used by the receiver 100 to process the last OFDM symbol of the sub-frame SF0, and 'FFT_size_0' is the FFT length used by the receiver 100 to process the last OFDM symbol of the sub-frame SF0, and 'GI_len_1' is the guard interval length of the sub-frame SF1, and 'FFT_win_adj' is an adjustment value. The 'FFT_win_adj' in the above formula can be obtained according to the attribute difference between the sub-frame SF1 and the sub-frame SF0. For example, when the guard interval length of the sub-frame SF1 is greater than the guard interval length of the sub-frame SF0, 'FFT_win_adj' is set by a negative value, and when the guard interval length of the sub-frame SF1 is smaller than the guard interval length of the sub-frame SF0, 'FFT_win_adj' is set by a positive value. It should be noted that the above calculation method is only used as an example. Since the relationship between the FFT window start point FFT_start and the channel offset CC_bias and the attribute of the sub-frame can be known by calculation of the relevant circuits, the FFT window start point calculation circuit 150 can obtain the FFT window start point FFT_start and the channel offset CC_bias applicable to the sub-frame SF1 through the above-mentioned relationship.

Figure 7:
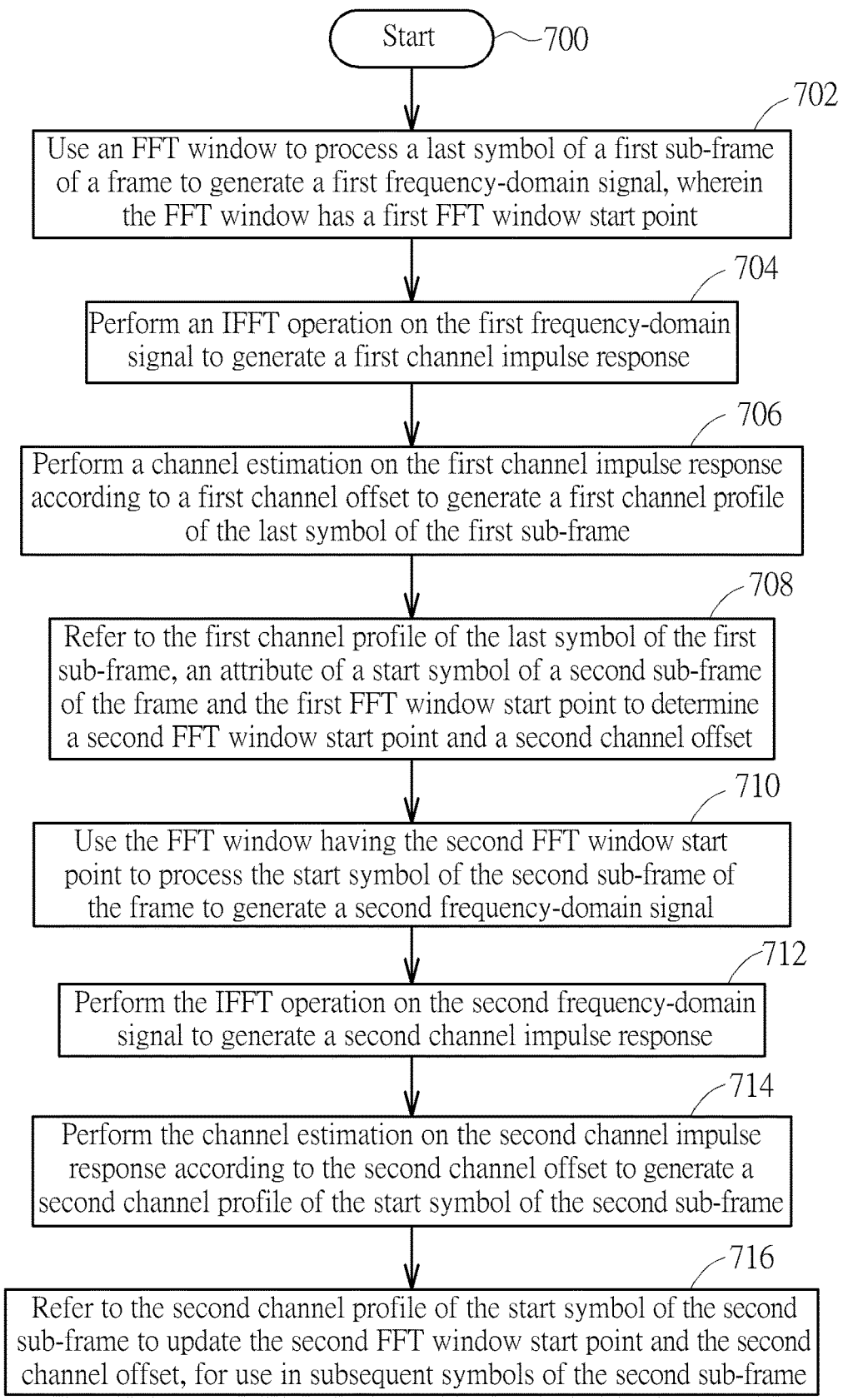
FIG. 7 is a flowchart of a signal processing method applied to the receiver according to an embodiment of the present invention.

FIG. 7 is a flowchart of a signal processing method applied to the receiver 100 according to an embodiment of the present invention. The signal processing method of the present invention comprises following steps:

Step 700: start.

Step 702: use an FFT window to process a last symbol of a first sub-frame of a frame to generate a first frequency-domain signal, wherein the FFT window has a first FFT window start point.

Step 704: perform an IFFT operation on the first frequency-domain signal to generate a first channel impulse response.

Step 706: perform a channel estimation on the first channel impulse response according to a first channel offset to generate a first channel profile of the last symbol of the first sub-frame.

Step 708: refer to the first channel profile of the last symbol of the first sub-frame, an attribute of a start symbol of a second sub-frame of the frame and the first FFT window start point to determine a second FFT window start point and a second channel offset.

Step 710: use the FFT window having the second FFT window start point to process the start symbol of the second sub-frame of the frame to generate a second frequency-domain signal.

Step 712: perform the IFFT operation on the second frequency-domain signal to generate a second channel impulse response.

Step 714: perform the channel estimation on the second channel impulse response according to the second channel offset to generate a second channel profile of the start symbol of the second sub-frame.

Step 716: refer to the second channel profile of the start symbol of the second sub-frame to update the second FFT window start point and the second channel offset, for use in subsequent symbols of the second sub-frame.

To briefly summarize the present invention, in the receiver and related signal processing method of the present invention, through using the channel profile of the last symbol of the current sub-frame and the attribute of the start symbol of the next sub-frame, the FFT window start point and the channel offset are calculated, for use in the start symbol of the next sub-frame. The present invention can solve the problem of poor subsequent signal quality or degraded decoding performance caused by sub-frame switching in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing method, comprising:
using a Fast Fourier Transform (FFT) window to process a last symbol of a first sub-frame of a frame to generate a first frequency-domain signal, wherein the FFT window has a first FFT window start point;
performing an Inverse Fast Fourier Transform (IFFT) operation on the first frequency-domain signal to generate a first channel impulse response;
performing a channel estimation on the first channel impulse response to generate a first channel profile of the last symbol of the first sub-frame;
referring to the first channel profile of the last symbol of the first sub-frame, an attribute of a start symbol of a second sub-frame of the frame and the first FFT window start point to determine a second FFT window start point; and
using the FFT window having the second FFT window start point to process the start symbol of the second sub-frame of the frame to generate a second frequency-domain signal.

2. The signal processing method of claim 1, further comprising:
performing the IFFT operation on the second frequency-domain signal to generate a second channel impulse response;
performing the channel estimation on the second channel impulse response to generate a second channel profile of the start symbol of the second sub-frame; and
referring to the second channel profile for updating the second FFT window start point to generate an updated second FFT window start point, for use in subsequent symbols of the second sub-frame.

3. The signal processing method of claim 1, wherein the step of performing the channel estimation on the first channel impulse response to generate the first channel profile of the last symbol of the first sub-frame comprises:
moving the first channel impulse response by a first channel offset to generate an adjusted first channel impulse response;
filtering the adjusted first channel impulse response to generate a processed first channel offset; and
referring to the processed first channel offset to generate the first channel profile of the last symbol of the first sub-frame; and
the signal processing method further comprises:
referring to the first channel profile of the last symbol of the first sub-frame, the attribute of the start symbol of the second sub-frame of the frame and the first channel offset to determine a second channel offset.

4. The signal processing method of claim 3, further comprising:
performing the IFFT operation on the second frequency-domain signal to generate a second channel impulse response;
moving the second channel impulse response by the second channel offset to generate an adjusted second channel impulse response;
filtering the adjusted second channel impulse response to generate a processed second channel offset; and
referring to the processed second channel offset to generate a second channel profile of the start symbol of the second sub-frame.

5. The signal processing method of claim 4, further comprising:
referring to the second channel profile for updating the second channel offset to generate an updated second channel offset, for use in subsequent symbols of the second sub-frame.

6. The signal processing method of claim 1, wherein the attribute of the second sub-frame and the attribute of the first sub-frame are different.

7. The signal processing method of claim 6, wherein an FFT length, a guard interval length and a scattered pilot pattern in each symbol of the second sub-frame are not all the same as an FFT length, a guard interval length and a scattered pilot pattern in each symbol of the first sub-frame.

8. The signal processing method of claim 1, wherein the method conforms to a specification of Advanced Television Systems Committee (ATSC) version 3.0.

9. A receiver, comprising:
a Fast Fourier Transform (FFT) circuit, configured to use an FFT window to process a last symbol of a first sub-frame of a frame to generate a first frequency-domain signal, wherein the FFT window has a first FFT window start point;

an Inverse Fast Fourier Transform (IFFT) circuit, configured to perform an IFFT operation on the first frequency-domain signal to generate a first channel impulse response;

a channel estimation circuit, configured to perform a channel estimation on the first channel impulse response to generate a first channel profile of the last symbol of the first sub-frame; and an FFT window start point calculation circuit, configured to refer to the first channel profile of the last symbol of the first sub-frame, an attribute of a start symbol of a second sub-frame of the frame and the first FFT window start point to determine a second FFT window start point;

wherein the FFT circuit uses the FFT window having the second FFT window start point to process the start symbol of the second sub-frame of the frame to generate a second frequency-domain signal.

10. The receiver of claim 9, wherein the IFFT circuit performs the IFFT operation on the second frequency-domain signal to generate a second channel impulse response, the channel estimation circuit performs the channel estimation on the second channel impulse response to generate a second channel profile of the start symbol of the second sub-frame, and the FFT window start point calculation circuit refers to the second channel profile for updating the second FFT window start point to generate an updated second FFT window start point, for use in subsequent symbols of the second sub-frame.

11. The receiver of claim 9, wherein the channel estimation circuit moves the first channel impulse response by a first channel offset to generate an adjusted first channel impulse response, and filters the adjusted first channel impulse response to generate a processed first channel offset, and refers to the processed first channel offset to generate the first channel profile of the last symbol of the first sub-frame; the channel estimation circuit refers to the first channel profile of the last symbol of the first sub-frame, the attribute of the start symbol of the second sub-frame of the frame and the first channel offset to determine a second channel offset.

12. The receiver of claim 11, wherein the IFFT circuit performs the IFFT operation on the second frequency-domain signal to generate a second channel impulse response; the channel estimation circuit moves the second channel impulse response by the second channel offset to generate an adjusted second channel impulse response, and filters the adjusted second channel impulse response to generate a processed second channel offset, and refers to the processed second channel offset to generate a second channel profile of the start symbol of the second sub-frame.

13. The receiver of claim 12, wherein the channel estimation circuit refers to the second channel profile for updating the second channel offset to generate an updated second channel offset, for use in subsequent symbols of the second sub-frame.

14. The receiver of claim 9, wherein the attribute of the second sub-frame and the attribute of the first sub-frame are different.

15. The receiver of claim 14, wherein an FFT length, a guard interval length and a scattered pilot pattern in each symbol of the second sub-frame are not all the same as an FFT length, a guard interval length and a scattered pilot pattern in each symbol of the first sub-frame.

16. The receiver of claim 9, wherein the receiver conforms to a specification of Advanced Television Systems Committee (ATSC) version 3.0.

* * * * *